United States Patent
Hornung et al.

(10) Patent No.: US 6,779,395 B2
(45) Date of Patent: Aug. 24, 2004

(54) DEVICE FOR MEASURING THE FLOW OF A GAS OR A LIQUID IN A BYPASS

(75) Inventors: Mark Hornung, Zürich (DE); Jens Kubasch, Zürich (DE); Moritz Lechner, Zürich (CH); Felix Mayer, Zürich (CH)

(73) Assignee: Sensirion AG, Zurich (CH)

( * ) Notice: Subject to any disclaimer, the term of this patent is extended or adjusted under 35 U.S.C. 154(b) by 0 days.

(21) Appl. No.: 10/718,099

(22) Filed: Nov. 20, 2003

(65) Prior Publication Data

US 2004/0118200 A1 Jun. 24, 2004

(30) Foreign Application Priority Data

Dec. 23, 2002 (CH) .............................................. 2205/02

(51) Int. Cl.[7] .............................. G01F 1/68; G01F 1/37
(52) U.S. Cl. ................................. 73/204.21; 73/861.52
(58) Field of Search .............................. 73/204.21, 202, 73/204.25, 204.22, 861.52, 861.63, 861.64

(56) References Cited

U.S. PATENT DOCUMENTS

| | | | |
|---|---|---|---|
| 4,672,997 A | 6/1987 | Landis et al. ................ 137/554 |
| 4,677,850 A | 7/1987 | Miura et al. ................... 73/204 |
| 4,783,996 A | 11/1988 | Ohta et al. ................ 73/204.17 |
| 4,829,818 A | 5/1989 | Bohrer ..................... 73/204.22 |
| 5,062,446 A | 11/1991 | Anderson ................... 137/468 |
| 5,404,753 A | 4/1995 | Hecht et al. ............. 73/204.22 |
| 5,533,412 A | 7/1996 | Jerman et al. ........... 73/861.95 |
| 5,750,892 A | 5/1998 | Huang et al. ................. 73/202 |
| 5,804,717 A | * 9/1998 | Lucas .......................... 73/202 |
| 6,119,730 A | * 9/2000 | McMillan .................... 73/202 |
| 6,351,390 B1 | 2/2002 | Mayer et al. ............... 361/760 |
| 6,425,414 B2 | 7/2002 | Jorgensen et al. .......... 137/597 |
| 6,575,927 B1 | * 6/2003 | Weitzel et al. ........... 73/861.18 |
| 6,655,207 B1 | * 12/2003 | Speldrich et al. ........ 73/204.21 |
| 6,668,642 B2 | * 12/2003 | Ambrosina et al. ........ 73/202.5 |
| 2002/0078744 A1 | 6/2002 | Gehman et al. .......... 73/204.11 |
| 2003/0066360 A1 | * 4/2003 | Kettle, Jr. et al. ....... 73/861.52 |
| 2003/0115952 A1 | 6/2003 | Mayer et al. ............. 73/204.26 |

FOREIGN PATENT DOCUMENTS

| | | | |
|---|---|---|---|
| DE | 19511687 | 10/1996 | ........... G01F/1/684 |
| DE | 10129300 | 2/2002 | .............. G01F/5/00 |
| EP | 0552916 | 7/1993 | ........... A61B/5/087 |
| EP | 0890828 | 1/1999 | ........... G01F/25/00 |
| GB | 2142437 | 1/1985 | ............. G01F/1/68 |
| WO | WO9603721 | 2/1996 | |
| WO | WO9726509 | 7/1997 | .............. G01F/5/00 |
| WO | WO0198736 | 12/2001 | ........... G01F/1/684 |

OTHER PUBLICATIONS

F. Mayer, et al. (1996) "Scaling of Thermal CMOS Gas Flow Microsensors: Experiment and Simulation", Proc. IEEE Micro Electro Mechanical Systems, (IEEE, 1996):116–121.

M. Ashauer, et al. (1998) "Thermal Flow Sensor for Liquids and Gases", Proc. IEEE Micro Electro Mechanical Systems, (IEEE, 1998):351–355.

* cited by examiner

Primary Examiner—Edward Lefkowitz
Assistant Examiner—Takisha Miller
(74) Attorney, Agent, or Firm—Cooper & Dunham LLP; Donald S. Dowden

(57) ABSTRACT

A device for measuring the flow of a fluid has a primary duct and a bypass arranged in series to the primary duct. The bypass has a first section and a second section. A baffle plate with a hole for the passage of the fluid is arranged in the first section. The second section comprises two parallel secondary ducts. In the first section, a turbulent flow dominates, while the flow in the second section is primarily laminar. If the turbulent effects in the bypass are sufficiently strong, the ratio of the flows in the primary duct and the bypass can be substantially independent of the fluid properties and of the flow rate. By using two parallel secondary ducts in the second section, high flow rates and therefore strongly turbulent effects can be achieved without exceeding the measuring range of the sensor.

12 Claims, 2 Drawing Sheets

DEVICE FOR MEASURING THE FLOW OF A GAS OR A LIQUID IN A BYPASS

CROSS REFERENCE TO RELATED APPLICATIONS

This application claims the priority of Swiss patent application 2205/02, filed Dec. 23, 2002, the disclosure of which is incorporated herein by reference in its entirety.

BACKGROUND OF THE INVENTION

The invention relates to a device for measuring the flow of a fluid, i.e. of a gas or a liquid, as well as to a bypass for such a device.

A device of this type is disclosed in WO 01/98736. It comprises a primary duct and a bypass. A flow sensor is arranged in the bypass. An advantage of such an arrangement is the fact that the flow rate to be measured in the bypass is smaller than in the primary duct, and it is therefore possible to measure higher flow rates.

While devices of this type have a wider measuring range, it has been found to be disadvantageous that the conversion of the flow in the bypass to the actual flow in the primary duct is prone to systematic errors.

BRIEF SUMMARY OF THE INVENTION

Hence, it is a general object of the invention to provide a device for measuring the flow of a fluid in a bypass that provides higher accuracy.

Now, in order to implement these and still further objects of the invention, which will become more readily apparent as the description proceeds, the device is manifested by the features that it comprises a primary duct, a bypass parallel to said primary duct, said bypass having a first section and a second section, a flow sensor arranged at said bypass, wherein the first section of the bypass generates a pressure drop $\Delta p1 = c1 \cdot vb + c2 \cdot vb^2$ with $c2 \neq 0$, wherein vb is the flow rate in the first section, and wherein the second section of the bypass comprises at least two secondary ducts arranged in parallel, wherein the secondary ducts are arranged in series to the first section.

In another aspect of the invention, a bypass for such a device is provided. The bypass is designed for being connected to a primary duct for measuring a flow of a fluid therein. The bypass comprises a flow sensor, a first section generating a pressure drop $\Delta p1 = c1 \cdot vb + c2 \cdot vb^2$ with $c2 \neq 0$, wherein vb is the flow rate in the first section, and a second section arranged in series to the second section, wherein the second section comprises at least two secondary ducts arranged in parallel, wherein the secondary ducts are arranged in series to the first section.

As the analysis below shows, it is advantageous to design the bypass in such a way that that the ratio of the flows in bypass and primary duct is substantially constant. This can e.g. be achieved by arranging at least one steplike, discontinuous change in diameter in the bypass, e.g. by using a baffle plate with a hole therein. In order to have comparatively strong turbulent contributions to the flow resistance, the diameter of the part that gives rise to the turbulence can be chosen to be very small. Such structures are, however, difficult to manufacture and suffer from problems due to clogging in operation.

Hence, the diameter of the structure causing the turbulence should not be too small. Hence, in order to achieve the desired turbulence, the flow in the bypass should still be fairly large, which in turn would lead to exceedingly large flow rates at the sensor. Therefore, according to the invention, a first part of the bypass is designed such that it shows a distinct dependence of the flow resistance and the pressure drop from the square of the flow rate vb. In a second section of the bypass, at least two parallel secondary ducts are provided, which are arranged in series to the first section. The flow sensor measures the flow in one of the secondary ducts.

By dividing the fluid in the second section into two or more secondary ducts and by an appropriate selection of the ratio of the diameters of the secondary ducts, the flow rate or flow velocity to be monitored by the flow sensor can be comparatively small. In the first section, however, the flow rate is the sum of all flow rates in the secondary ducts and can therefore be higher and give rise to strong turbulent effects.

Since two or more secondary ducts are used, the system designer can use additional design parameters for optimizing the flow conditions for the desired measuring range.

Dividing the second section into several secondary ducts has the further advantage that the diameter of the secondary duct where the flow sensor is arranged can be comparatively small, which improves the laminarity of the flow at the sensor and therefore the accuracy of measured results.

The described embodiment can be used for measuring gases or liquids.

BRIEF DESCRIPTION OF THE DRAWINGS

The invention will be better understood and objects other than those set forth above will become apparent when consideration is given to the following detailed description thereof. Such description makes reference to the annexed drawings, wherein.

DETAILED DESCRIPTION OF THE INVENTION

Figure 1:
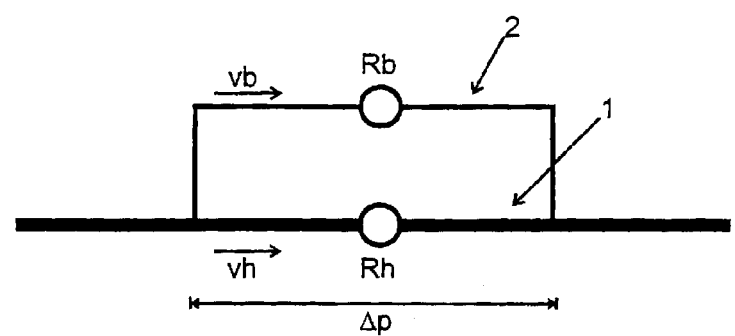
FIG. 1 is a schematic illustration of a device with a primary duct and a bypass.

Before describing a detailed embodiment, we first discuss, from a theoretical point of view, the flow conditions in devices having a primary duct and a bypass. For this purpose, we refer to FIG. 1, which shows a primary duct 1 and a bypass 2, the latter being parallel to a section of the primary duct. A fluid, such as a liquid or a gas, flows through the device. The flow rate (i.e. the flow velocity integrated over the cross section of the duct) in the primary duct is designated by vh and in the bypass by vb. The primary duct offers a non-linear flow resistance Rh to the flow, the bypass an also non-linear flow resistance Rb. The pressure drop over primary duct and bypass is $\Delta p$. We have $$\Delta p = \eta \cdot Kh1 \cdot vh + \rho \cdot Kh2 \cdot vh^2 \qquad (1)$$

and $$\Delta p = \eta \cdot Kb1 \cdot vb + \rho \cdot Kb2 \cdot vb^2 \qquad (2)$$

where $\eta$ and $\rho$ designate the viscosity and density of the fluid, Kh1 and Kh2 the linear and quadratic contributions of the flow resistance in the primary duct and Kb1 and Kb2 the linear and quadratic contributions of the flow resistance in the bypass.

Advantageously, the quantities Kh1, Kh2, Kb1 and Kb2 are chosen approximately as follows:

$$Kb1 = n \cdot Kh1 \text{ and } Kb2 = n^2 \cdot Kh2 \quad (3)$$

with a constant n>1, in particular n>>1. The choice according to equation (3) is advantageous because, in this case (as it can be shown easily) the ratio between the flow rates in the primary duct and the bypass is substantially constant over the whole flow range with $$vb = vh/n, \quad (4)$$

independently of the material parameters η and ρ (i.e. independently of the fluid composition).

From equation (3) it follows that the turbulent contribution in the bypass, characterized by Kb2, must be comparatively high compared to the corresponding linear contribution (characterized by Kb1), much higher than in the primary duct.

If the flow in bypass 2 is to be measured, a corresponding flow sensor should be arranged in a region of low turbulence because measurements in turbulent fluids are difficult. Advantageously, the bypass is therefore divided into a first section, where a strong turbulence occurs, and a second section, where the flow is as laminar as possible. The first section dominates the term Kb2 of the bypass.

In other words, the pressure drop over the first section is $$\Delta p1 = c1 \cdot vb + c2 \cdot vb^2 \text{ with } c2 \neq 0, \quad (5)$$

where the constants c1 and c2 describe the linear and quadratic flow resistance of the first section 2a. As a rule, the following approximation may be used $$c2 = \rho \cdot Kb2. \quad (6)$$

The second section, where the measurement is advantageously carried out, has a linear current resistance (coefficient Kb1), which is as small as possible. However, the second section advantageously does not consist of a single tube with large diameter because, in that case, the flow velocity at the sensor would be low and its range of measurement could not be exploited fully.

Figure 2:
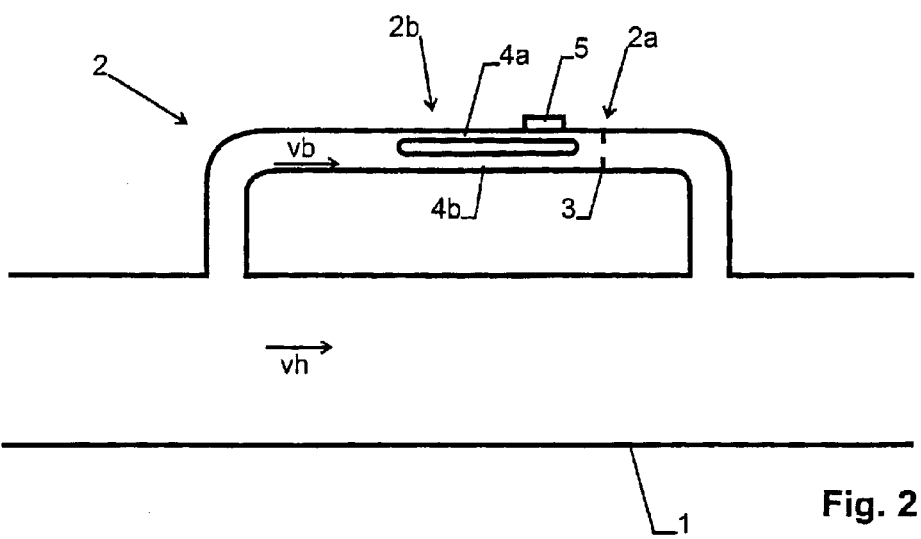
FIG. 2 shows a device where the bypass has two secondary ducts.

Therefore, a device as shown schematically in FIG. 2 is used. In this device, a baffle plate 3 with a hole for the passing fluid is arranged in first section 2a, while two secondary ducts 4a, 4b are provided in second section 2b. The secondary ducts 4a, 4b are parallel to each other and in series to baffle plate 3. The actual flow sensor 5 is arranged at one of the secondary ducts.

This arrangement has the advantage that, by suitable choice of the diameters of the two secondary ducts 4a, 4b, the flow through bypass 2 can be divided into the secondary ducts in such a manner that the measuring range of the sensor can be exploited fully. By using several secondary ducts, the linear flow resistance in the bypass (coefficient Kb1) can be comparatively small such that the quadratic contribution (coefficient Kb2) does not have to be very large.

A suitable flow sensor 5 is preferably a semiconductor device having a heating in contact with the fluid and measuring the heat distribution or heat dissipation in the fluid. The quantity measured in this way depends on the mass flow (i.e. the product of density and flow rate) in the measured secondary duct. A suitable sensor is e.g. disclosed in U.S. Pat. No. 6,550,324.

Advantageously, as shown in FIG. 2, second section 2b of bypass 2 is, as seen in the direction of the flow, arranged before first part 2a. This allows to prevent the turbulences generated in first section 2a from disturbing the measurement of flow sensor 5 in second section 2b.

Figure 3:
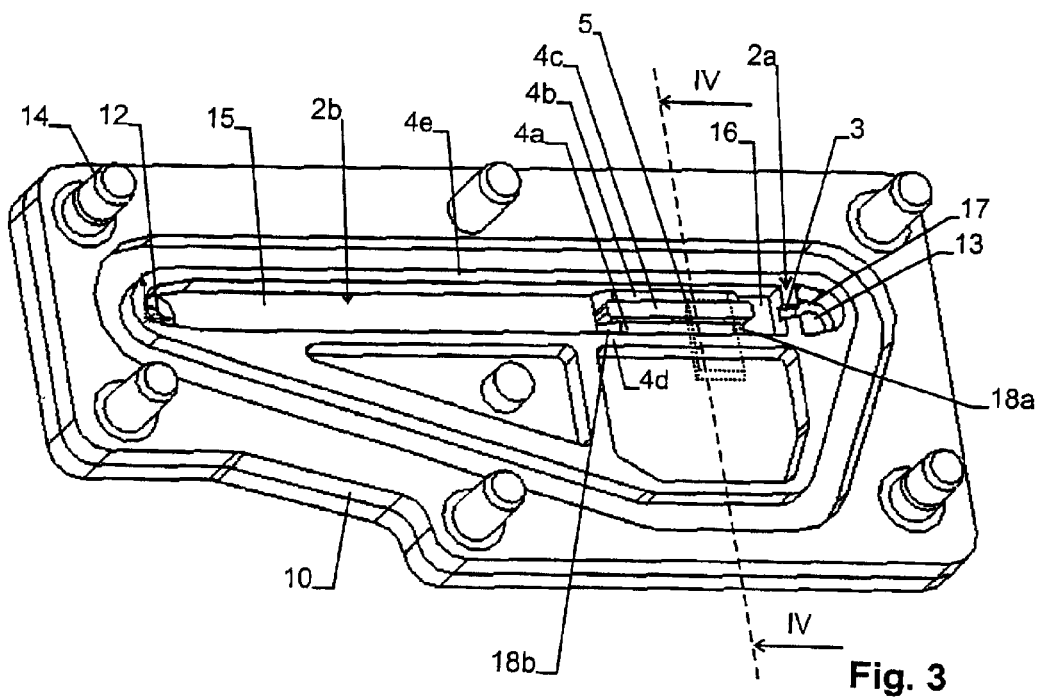
FIG. 3 shows a housing part for a bypass.

In the following, a specific embodiment of the device is described with reference to FIGS. 3 and 4. In this embodiment, bypass 2 is formed by a first and a second housing part 10, 11, only the first part 10 of which is shown in FIG. 3. Second housing part 11 is formed by a printed circuit board having holes for receiving attachment pins 14 of first housing section 10.

Two openings 12, 13 are arranged in housing part 10, both of which are connected to primary duct 1. Opening 12 forms an entry for the fluid into bypass 2, and opening 13 the exit back into primary duct 1. The fluid entering through opening 12 arrives in a duct part 15 of the second section 2b of the bypass, which then branches into the two secondary ducts 4a, 4b. In order to maintain a laminar flow in this region, duct part 15 extends into the same direction as the secondary ducts 4a, 4b, and the transitions are without discontinuous steps. The secondary ducts 4a, 4b are separated by a central wall 4c and enclosed by lateral walls 4d, 4e. The fluid exiting from secondary ducts 4a, 4b arrives in a first chamber 16 of first section 2a and then passes through baffle plate 3 into a second chamber 17, from where it flows through opening 13 back into the primary duct.

Flow sensor 5 is, as shown in dashed lines in FIG. 3, arranged at first secondary duct 4a, close to an exit end 18a thereof. In other words, the distance between the entry end 18b of secondary duct 4 and sensor 5 is substantially larger than the distance between exit end 18a and sensor 5. In this way, the length of secondary duct 4a can be exploited to bring the flow of the liquid into a non-turbulent, laminar state before it arrives at sensor 5.

Figure 4:
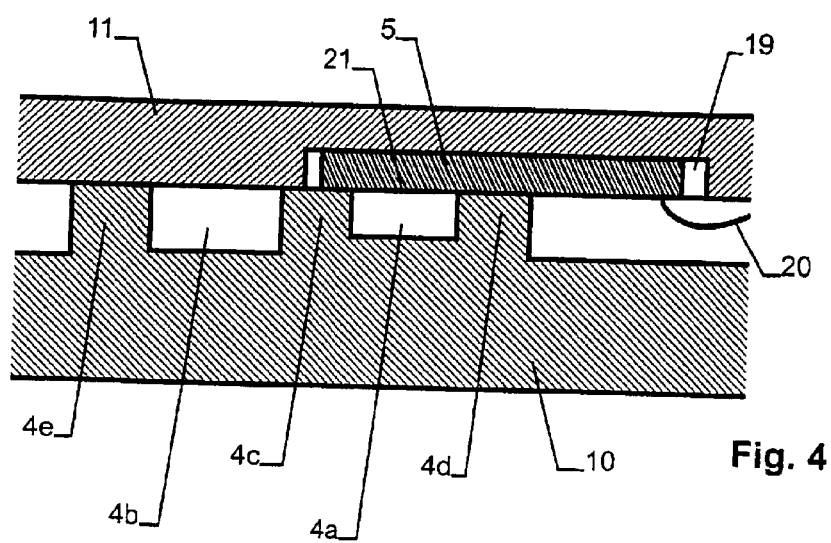
FIG. 4 is a sectional view through the bypass along line IV—IV of FIG. 3.

AS can be seen from FIG. 4, flow sensor 5 is arranged in a recess 19 of second housing part 11 and connected to printed circuit leads on second housing part 11 by means of connecting wires 20. A part of recess 19 is arranged over first secondary duct 4a. The sensor in this part is laterally enclosed by the walls 4c and 4d and carries the actual detector elements 21 of the sensor.

As can also be seen from FIG. 4, first secondary duct 4a has a smaller cross section than second secondary duct 4b. This allows to pass a comparatively large amount of fluid through bypass 2 and therefore to achieve a stronger turbulence at baffle plate 3 without exceeding the measuring range of the sensor.

Instead of using a baffle plate 3, first section 2a of the bypass can also comprise a canal section with an inner diameter that changes non-continuously, in stepwise manner, or a sharp corner where the fluid has go through a sudden change of direction. A baffle plate with a hole, i.e. a place where the cross section is first non-continuously reduced and the non-continuously increased again, is, however, preferred, because it is easy to manufacture while causing strong turbulent effects.

It is also possible to arrange a flow sensor in more than one of the secondary ducts.

In another embodiment, duct part 15 can be dispensed with, and the secondary ducts 4a, 4b can be connected with their input ends directly to the primary duct, either by means of a common opening or by means of separate openings.

With the device as shown here, the flow velocity or the volume flow (e.g. in m/s or, after integration over the cross section of the ducts, in m³/s) of the fluid can be measured, but also the mass flow (e.g. in kg/m²/s or, after integration, in kg/s).

While there are shown and described advantageous embodiments of the invention, it is to be distinctly understood that the invention is not limited thereto but may be otherwise variously embodied and practiced within the scope of the following claims.

What is claimed is:

1. A device for measuring the flow of a fluid comprising
   a primary duct,
   a bypass parallel to said primary duct, said bypass having a first section and a second section
   a flow sensor arranged at said bypass,
   wherein the first section of the bypass generates a pressure drop $\Delta p_1 = c_1 \cdot vb + c_2 \cdot vb^2$ with $c_2 \neq 0$, wherein vb is the flow rate in the first section,
   and wherein the second section of the bypass comprises at least two secondary ducts arranged in parallel, wherein the secondary ducts are arranged in series to the first section.

2. The device of claim 1 wherein the flow sensor is arranged in the second section.

3. The device of claim 2 where the second section is, as seen in a flow direction of the fluid, arranged before the first section.

4. The device of claim 1 wherein said first section comprises a canal section an inner diameter of which changes non-continuously.

5. The device of claim 1 wherein said first section comprises a baffle plate arranged transversally to a flow direction of said fluid, wherein an opening is arranged in said plate for passage of the fluid.

6. The device of claim 1 comprising a first and a second secondary duct arranged in said second section, wherein the flow sensor is arranged at the first secondary duct.

7. The device of claim 6 wherein the first secondary duct has a diameter smaller to or equal to a diameter of the second secondary duct.

8. Device of claim 6 wherein said first secondary duct has an entry end for entry of the fluid and an exit end for exit of said fluid, wherein said flow sensor is arranged closer to said exit end than to said entry end.

9. The device of claim 1 wherein a pressure drop over the primary duct is approximately given by $$\Delta p = \eta \cdot Kh1 \cdot vh + \rho \cdot Kh2 \cdot vh^2,$$

wherein $\eta$ and $\rho$ are the viscosity and density of the fluid and vh the flow rate in the primary duct, and wherein the pressure drop over the bypass is approximately given by $$\Delta p = \eta \cdot Kb1 \cdot vb + \rho \cdot Kb2 \cdot vb^2,$$

wherein vb is the flow rate in the bypass and wherein Kh1, Kh2, are the linear and quadratic flow resistances in the primary duct and Kb1, Kb2 the linear and quadratic flow resistances in the bypass, approximately with $$Kb1 = n \cdot Kh1 \text{ and } Kb2 = n^2 \cdot Kh2$$

with a constant $n > 1$.

10. The device of claim 1 wherein the bypass is formed by a housing, said housing comprising
    a first housing part having openings for being connected with the primary duct and recesses for forming the bypass and
    a second housing part covering the recesses of the first housing part.

11. The device of claim 1 wherein said first section is in series to said second section.

12. A bypass for being connected to a primary duct for measuring a flow of a fluid, said bypass comprising
    a flow sensor,
    a first section generating a pressure drop $\Delta p_1 = c_1 \cdot vb + c_2 \cdot vb^2$ with $c_2 \neq 0$, wherein vb is the flow rate in the first section, and
    a second section arranged in series to the second section,
    wherein the second section comprises at least two secondary ducts arranged in parallel, wherein the secondary ducts are arranged in series to the first section.

* * * * *